US012198652B2

(12) United States Patent
Chuang et al.

(10) Patent No.: US 12,198,652 B2
(45) Date of Patent: Jan. 14, 2025

(54) TIMING CONTROLLER CIRCUIT

(71) Applicant: HIMAX TECHNOLOGIES LIMITED, Tainan (TW)

(72) Inventors: Chia-Ming Chuang, Tainan (TW); Ming-Hung Weng, Tainan (TW); Cheng-Che Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 299 days.

(21) Appl. No.: 17/878,069

(22) Filed: Aug. 1, 2022

(65) Prior Publication Data

US 2023/0111507 A1 Apr. 13, 2023

(30) Foreign Application Priority Data

Oct. 13, 2021 (TW) ................................ 110137957

(51) Int. Cl.
*G09G 3/36* (2006.01)

(52) U.S. Cl.
CPC ......... *G09G 3/3677* (2013.01); *G09G 3/3688* (2013.01); *G09G 2310/0286* (2013.01); *G09G 2310/08* (2013.01); *G09G 2340/0414* (2013.01); *G09G 2340/0435* (2013.01)

(58) Field of Classification Search
CPC ................. G09G 5/006; G09G 3/3677; G09G 2340/0435; G09G 2340/0414; G09G 2310/08; G09G 2310/0286
See application file for complete search history.

(56) References Cited

U.S. PATENT DOCUMENTS

| | | | | |
|---|---|---|---|---|
| 2012/0223927 | A1* | 9/2012 | Hsieh | G09G 3/342 345/87 |
| 2015/0264298 | A1* | 9/2015 | Colenbrander | G09G 5/001 345/547 |
| 2016/0104418 | A1 | 4/2016 | Keum | |
| 2017/0148392 | A1* | 5/2017 | Kim | G09G 3/3677 |
| 2019/0180691 | A1* | 6/2019 | Takasugi | G09G 3/3266 |

FOREIGN PATENT DOCUMENTS

| | | |
|---|---|---|
| TW | 200425038 | 11/2004 |
| TW | 200802251 | 1/2008 |
| TW | 200907907 | 2/2009 |
| TW | 200919418 | 5/2009 |
| TW | 201128625 A1 | 8/2011 |
| TW | 201133457 A1 | 10/2011 |
| TW | 201506899 A | 2/2015 |

* cited by examiner

*Primary Examiner* — Shaheda A Abdin
(74) *Attorney, Agent, or Firm* — Winston Hsu

(57) ABSTRACT

A timing controller circuit is arranged to control at least a gate in panel (GIP) circuit in a display panel, and includes a data receiving circuit, a timing detection circuit, a control circuit, and a data transmitting circuit, wherein the data receiving circuit is arranged to receive an image data, the timing detection circuit is coupled to the data receiving circuit, and is arranged to detect an input timing of the image data, the control circuit is coupled to the timing detection circuit, and is arranged to determine a GIP timing of the GIP circuit according to the input timing of the image data, and generate a timing control output according to the GIP timing, and the data transmitting circuit is coupled to the control circuit, and is arranged to transmit the timing control output to the GIP circuit.

12 Claims, 6 Drawing Sheets

TIMING CONTROLLER CIRCUIT

BACKGROUND OF THE INVENTION

1. Field of the Invention

The present invention is related to a timing controller circuit applied to a display panel, and more particularly, to a timing controller circuit that increases a charge time by switching a gate in panel (GIP) timing and generating a data masking signal.

2. Description of the Prior Art

In recent years, the size of liquid crystal display (LCD) panels has become larger and the resolution of the LCD panels has become higher, thereby shortening the charging time of a data line of the LCD panels. As a result, the charging time of LCD panels with high resolution is insufficient meaning the grayscale of the LCD panel cannot be displayed correctly. Panel manufacturers have proposed various methods to improve the problem of insufficient charging time. For example, an HG2D (half gate, two data) architecture is proposed in a panel with a specification of 8K×4K @ 120 Hertz (Hz) (i.e. the resolution of the panel is 8K×4K, and the frame rate of the panel is 120 Hz), which will sequentially turn on two gates in all gates of the panel at the same time, so that the charging time can be increased to twice that of the charging time under a 1G1D (one gate, one data) architecture. The HG2D architecture will increase a number of the source drivers, however, which leads to increased costs. As a result, a novel timing controller circuit is urgently needed to improve the problem of insufficient charge time.

SUMMARY OF THE INVENTION

It is therefore one of the objectives of the present invention to provide a timing controller circuit that increases the charge time by switching a GIP timing and generating a data masking signal.

In an embodiment of the present invention, a timing controller circuit that is arranged to at least control a GIP circuit in a display panel is provided. The timing controller circuit may include a data receiving circuit, a timing detection circuit, a control circuit, and a data transmitting circuit. The data receiving circuit may be arranged to receive an image data. The timing detection circuit may be coupled to the data receiving circuit, and may be arranged to detect an input timing of the image data. The control circuit may be coupled to the timing detection circuit, and may be arranged to determine a GIP timing of the GIP circuit according to the input timing of the image data, and generate a timing control output according to the GIP timing, wherein in response to different input timings of the image data, the control circuit performs switching selection between different GIP timings of the GIP circuit. The data transmitting circuit may be coupled to the control circuit, and may be arranged to transmit the timing control output to the GIP circuit.

In an embodiment of the present invention, a timing controller circuit that is arranged to at least control a GIP circuit in a display panel is provided. The timing controller circuit may include a data receiving circuit, a timing detection circuit, a data processing circuit, a control circuit, and a data transmitting circuit. The data receiving circuit may be arranged to receive an image data. The timing detection circuit may be coupled to the data receiving circuit, and may be arranged to detect an input timing of the image data. The data processing circuit may be coupled to the timing detection circuit, and may be arranged to perform data masking on the image data according to the input timing of the image data, to generate a data masking signal. The control circuit may be coupled to the timing detection circuit, and may be arranged to determine a GIP timing of the GIP circuit according to the input timing of the image data, and generate a timing control output according to the GIP timing. The data transmitting circuit may be coupled to the control circuit and the data processing circuit, and may be arranged to transmit the timing control output and the data masking signal to the display panel.

In an embodiment of the present invention, a timing controller circuit that is arranged to at least control a GIP circuit in a display panel is provided. The timing controller circuit may include a data receiving circuit, a timing detection circuit, a control circuit, and a data transmitting circuit. The data receiving circuit may be arranged to receive an image data. The timing detection circuit may be coupled to the data receiving circuit, and may be arranged to detect an input timing of the image data. The control circuit may be coupled to the timing detection circuit, and may be arranged to determine a GIP timing of the GIP circuit according to the input timing of the image data, and generate a timing control output according to the GIP timing. The data transmitting circuit may be coupled to the control circuit, and may be arranged to transmit the timing control output to the display panel, wherein the timing control output controls the GIP circuit to sequentially turn on at least two gates in all gates of the display panel at the same time.

When the resolution and the frame rate of the display panel are 8K×2K and 60 Hz, respectively, and the input timing of the image data is 8K×2K @ 120 Hz, the timing controller circuit of the present invention will control the GIP circuit to sequentially turn on two gate lines in a plurality of gate lines of the display panel at the same time (i.e. sequentially turn on two gates in the gates of a plurality of thin film transistors (TFT) connected to a same data line in the display panel at the same time), wherein sub-pixels corresponding to the two gates, respectively, will display a same sub-pixel data transmitted by the data transmitting circuit in the image data. In this way, the frame rate of the display panel is increased from the original 60 Hz to 120 Hz (i.e. doubled). In addition, the horizontal resolution of the display panel is maintained at 8K, and the vertical resolution of the display panel is reduced from 4K to 2K; however, the resolution of the display panel is still maintained at true 8K. As a result, under the condition that the timing controller circuit of the present invention has only one timing controller, the frame rate of the display panel is increased, and the dynamic visuals of the display panel will be improved. In addition, the charge time of each data line of the display panel is maintained at 3.74 microseconds (μs).

In addition, when the resolution and the frame rate of the display panel are 8K×4K and 120 Hz, respectively, and the input timing of the image data is 8K×4K @ 120 Hz, the timing controller circuit of the present invention will generate a data masking signal to control the source driver circuit to mask odd line data and only drive even line data in each even frame of the image data, and control the source driver circuit to mask the even line data and only drive the odd line data in each odd frame of the image data. In this way, each frame of the display panel will only display data whose input timing is 8K×2K @ 120 Hz. As a result, the timing controller circuit of the present invention may utilize the interlaced scanning structure to double the charging time of each data line of the display panel from the original 1.87 μs to 3.74 μs, to thereby improve the problem of insufficient charging time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
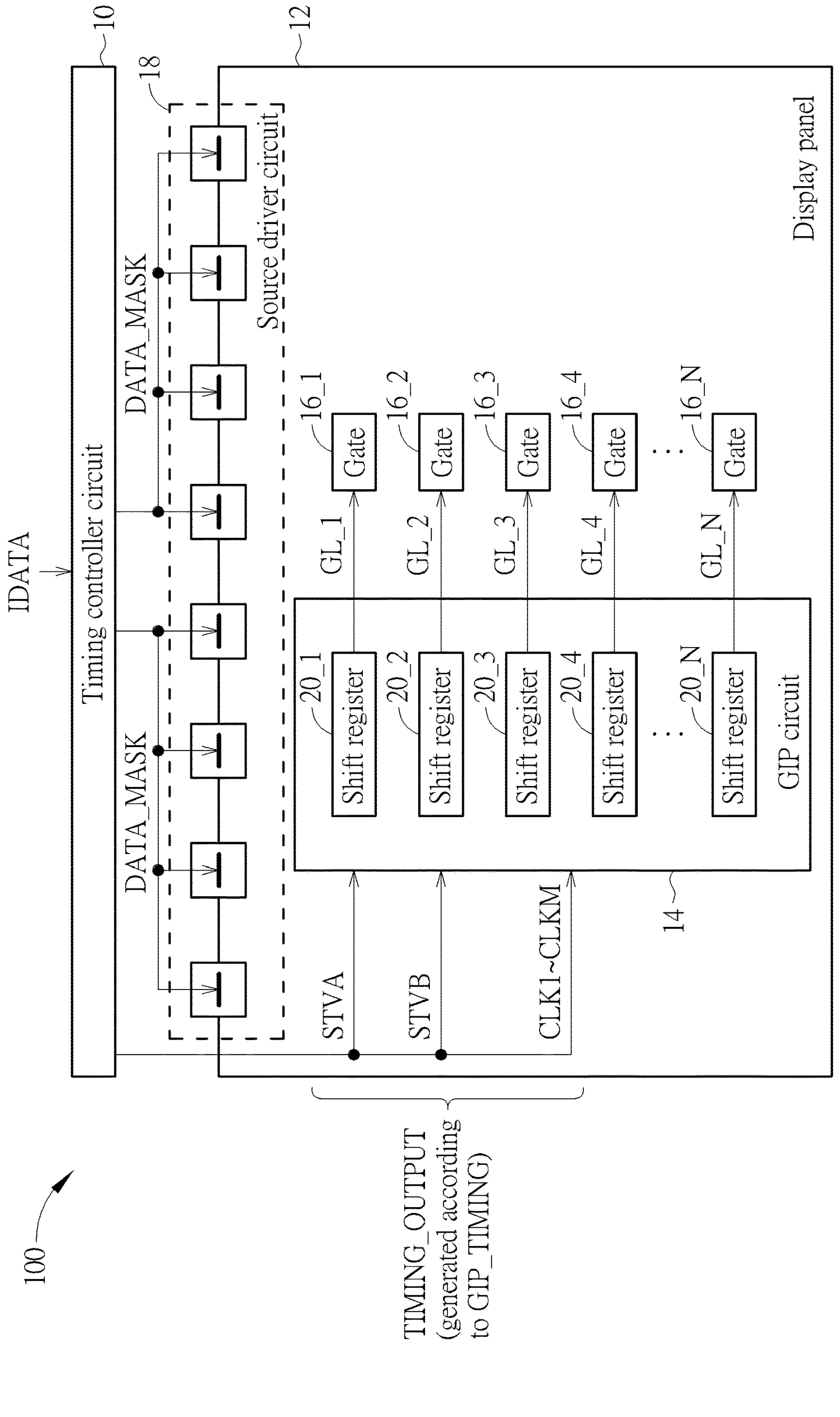
FIG. 1 is a block diagram illustrating a display system according to an embodiment of the present invention.

FIG. 1 is a block diagram illustrating a display system 100 according to an embodiment of the present invention. As shown in FIG. 1, the display system 100 may include a timing controller circuit 10 and a display panel 12, wherein the display panel 12 may include a gate in panel (GIP) circuit 14, a plurality of gates 16_1-16_N (e.g. gates of a plurality of thin-film transistors (TFT)), and a source driver circuit 18. The GIP circuit 14 acts as a gate driver circuit, and may be arranged to control opening/closing of the gates on a plurality of gate lines GL_1-GL_N, and may include a plurality of shift registers 20_1-20_N, wherein the shift registers 20_1-20_N correspond to the gate lines GL_1-GL_N, respectively, and the gate lines GL_1-GL_N are coupled to the gates 16_1-16_N, respectively. For convenience of description, only one gate on each gate line is illustrated in FIG. 1. In practice, each gate line is connected to the gates of the plurality of TFTs in the horizontal direction. In addition, the display panel 12 has a plurality of data lines, and each data line is connected to the sources of the plurality of TFTs in the vertical direction. The source driver circuit 18 may be arranged to control the driving voltage applied to each data line according to an image data IDATA. The number of gate lines GL_1-G1_N and the number of data lines (not shown) may be determined according to the resolution W×H of the display panel 12, wherein each pixel of the display panel 12 is composed of three sub-pixels: a red (R) sub-pixel, a green (G) sub-pixel, and a blue (B) sub-pixel. As a result, the horizontal resolution W of the display panel 12 determines the number of data lines in the horizontal direction as W*3, and the vertical resolution H of the display panel 12 determines the number of gate lines GL_1-GL_N in the vertical direction as H (i.e. N=H). For example, under the condition that the resolution of the display panel 12 is 8K×4K, the vertical direction of the display panel 12 may include 4320 gates 16_1-16_4320 (i.e. N=4320) that are located on 4320 gate lines GL_1-GL_4320, respectively, and the source of the corresponding 4320 TFTs that have the gates 16_1-16_4320, respectively, will be connected to the same data line. In addition, the GIP circuit 14 may include 4320 shift registers 20_1-20_4320, wherein the 4320 shift registers 20_1-20_4320 correspond to the 4320 gate lines GL-1-GL_4320, respectively.

The timing controller circuit 10 may be arranged to receive the image data IDATA, and detect an input timing IN_TIMING of the image data IDATA. In addition, the timing controller circuit 10 may perform data masking on the image data IDATA according to the input timing IN_TIMING of the image data IDATA to generate a data masking signal DATA_MASK, and determine a GIP timing GIP_TIMING of the GIP circuit 14 according to the input timing IN_TIMING of the image data IDATA, wherein the timing controller circuit 10 may generate a timing control output TIMING_OUTPUT to the GIP circuit 14 according to the GIP timing GIP_TIMING. It should be noted that, in some embodiments, in response to different input timings IN_TIMING of the image data IDATA, the timing controller circuit 10 will perform switching selection between different GIP timings GIP_TIMING of the GIP circuit 14. In addition, in some embodiments, the timing controller circuit 10 will not perform data masking on the image data IDATA according to the input timing IN_TIMING of the image data IDATA (i.e. the data masking signal DATA_MASK will not be generated), but instead will directly transmit the image data IDATA to the display panel 12 (e.g. the source driver circuit 18 of the display panel 12). Then, the timing controller circuit 10 may transmit the timing control output TIMING_OUTPUT and the image data IDATA (or the timing control output TIMING_OUTPUT, the image data IDATA, and the data masking signal DATA_MASK) to the display panel 12, wherein the timing control output TIMING_OUTPUT is transmitted to the GIP circuit 14, and the image data IDATA (or the image data IDATA and the data masking signal DATA_MASK) is transmitted to the source driver circuit 18.

In this embodiment, the timing control output TIMING_OUTPUT may include a first starting pulse signal STVA, a second starting pulse signal STVB, and a plurality of clock signals CLK1-CLKM. The first starting pulse signal STVA may be arranged to pre-charge the shift register 20_1 in the shift registers 20_1-20_N, to sequentially turn on a plurality of odd shift registers (i.e. the shift register 20_1, the shift register 20_3, the shift register 20_5, and so on) corresponding to a plurality of odd gate lines (i.e. GL_1, GL_3, GL_5, and so on) in the GIP circuit 14. The second starting pulse signal STVB may be arranged to pre-charge the shift register 20_2 in the shift registers 20_1-20_N, to sequentially turn on a plurality of even shift registers (i.e. the shift register 20_2, the shift register 20_4, the shift register 20_6, and so on) corresponding to a plurality of even gate lines (i.e. GL_2, GL_4, GL_6, and so on) in the GIP circuit 14. The clock signals CLK1-CLKM may be arranged to drive the odd gate lines and the even gate lines through the odd shift registers and the even shift registers, respectively, to turn on the gates connected to each gate line (e.g. the gates 16_1-16_N in the vertical direction will be turned on one by one according to the driving timing of the gate lines GL_1-GL_N). For example, under the condition that the resolution of the display panel 12 is 8K×4K (i.e. the display panel 12 may include the gates 16_1-16_4320, which are the gates of 4320 TFTs on the same data line, respectively), the timing control output TIMING_OUTPUT may include the clock signals CLK1-CLK10 (i.e. M=10), wherein each of the clock signals CLK1-CLK10 has 432 pulses to turn on 432 gate lines in the 4320 gate lines GL_1-GL_4320, respectively. For the gates 16_1-16_4320 of 4320 TFTs on the same data line, the 432 pulses of each clock signal of the clock signals CLK1-CLK10 will turn on 432 gates in the gates 16_1-16_4320 (e.g. the 432 pulses in the clock signal CLK1 will turn on the gates 16_1, 16_11, 16_21, . . . , 16_4311, respectively).

Figure 2:
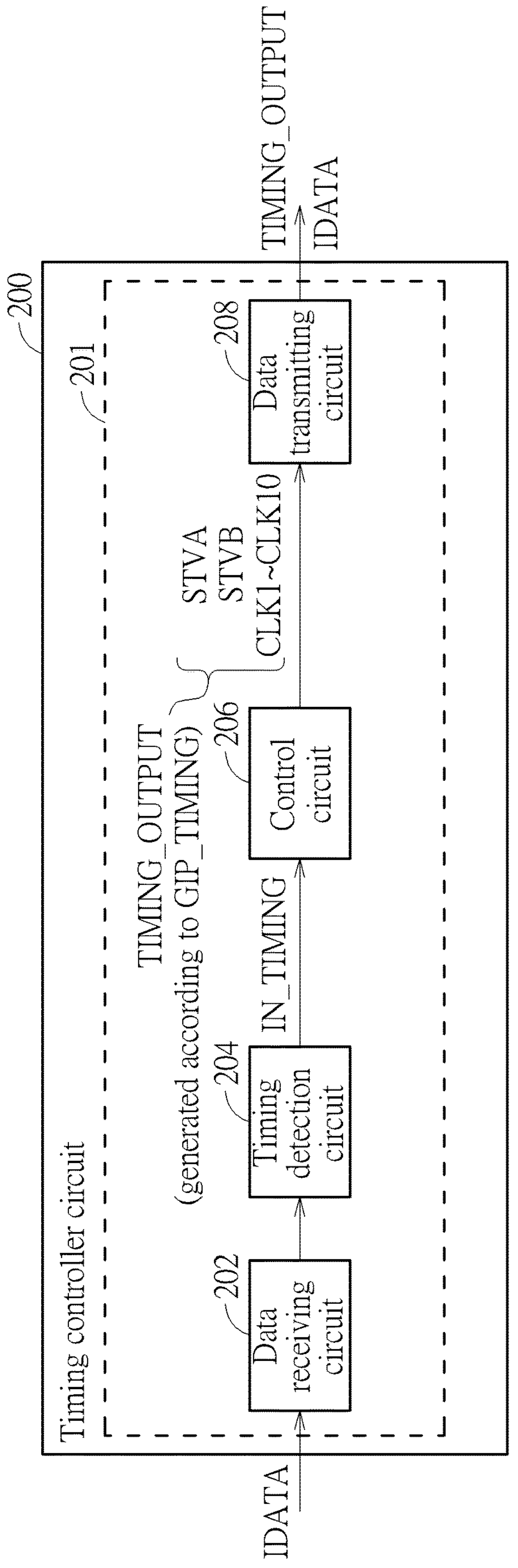
FIG. 2 is a diagram illustrating a timing controller circuit according to an embodiment of the present invention.

FIG. 2 is a diagram illustrating a timing controller circuit 200 according to an embodiment of the present invention. The timing controller circuit 10 shown in FIG. 1 may be implemented by the timing controller circuit 200 shown in FIG. 2. It should be noted that, in this embodiment, the resolution and the frame rate of the display panel 12 are 8K×4K and 60 Hz, respectively, and the timing controller circuit 200 will not perform data masking on the image data IDATA according to the input timing IN_TIMING of the image data IDATA (i.e. the data masking signal DATA_MASK will not be generated), but instead will directly transmit the image data IDATA to the display panel 12 (e.g. the source driver circuit 18 of the display panel 12). In addition, the timing controller circuit 200 has only one timing controller 201, and the timing controller 201 may be arranged to control the gate driving and the data driving (i.e. the source driving) of all sub-pixels of the display panel 12.

As shown in FIG. 2, the timing controller circuit 200 (more particularly, the timing controller 201) may include a data receiving circuit 202, a timing detection circuit 204, a control circuit 206, and a data transmitting circuit 208. The data receiving circuit 202 may be arranged to receive the image data IDATA, wherein the input timing IN_TIMING of the image data IDATA may be 8K×4K @ 60 Hz (i.e. the resolution and the frame rate of the image data IDATA are 8K×4K and 60 Hz, respectively) or 8K×2K @ 120 Hz (i.e. the resolution and the frame rate of the image data IDATA are 8K×2K and 120 Hz, respectively). The timing detection circuit 204 may be coupled to the data receiving circuit 202, and may be arranged to detect the input timing IN_TIMING of the image data IDATA. The control circuit 206 may be coupled to the timing detection circuit 204, and may be arranged to determine the GIP timing GIP_TIMING of the GIP circuit 14 according to the detected input timing IN_TIMING of the image data IDATA, and generate the timing control output TIMING_OUTPUT (which includes the first starting pulse signal STVA, the second starting pulse signal STVB, and the clock signals CLK1-CLK10 according to the GIP timing GIP_TIMING, wherein in response to different input timings IN_TIMING of the image data IDATA, the control circuit 206 will perform switching selection on different GIP timings GIP_TIMING of the GIP circuit 14. The data transmitting circuit 208 may be coupled to the control circuit 206, and may be arranged to transmit the timing control output TIMING_OUTPUT to the GIP circuit 14, and output the image data IDATA to the source driver circuit 18.

For example, when the input timing IN_TIMING of the image data IDATA is 8K×4K @ 60 Hz, the timing control output TIMING_OUTPUT will control the GIP circuit 14 to sequentially turn on each gate line in the gate lines GL_1-GL_4320 of the display panel 12 (i.e. sequentially turn on each gate in the gates 16_1-16_4320 in the vertical direction that are connected to the same data line in the display panel 12), to illuminate the display panel 12. In another example, when the input timing IN_TIMING of the image data IDATA is 8K×2K @ 120 Hz, the timing control output TIMING_OUTPUT will control the GIP circuit 14 to sequentially turn on two gate lines in the gate lines GL_1-GL_4320 of the display panel 12 at the same time (i.e. sequentially turn on two gates in the gates 16_1-16_4320 in the vertical direction that are connected to the same data line in the display panel 12 at the same time), wherein the sub-pixels corresponding to the two gates, respectively, will display the same sub-pixel data transmitted by the data transmitting circuit 208 in the image data IDATA at the same time. In this way, the frame rate of the display panel 12 is increased from the original 60 Hz to 120 Hz (i.e. doubled). In addition, the horizontal resolution of the display panel is maintained at 8K, and the vertical resolution of the display panel is reduced from 4K to 2K. The resolution of the display panel, however, is still maintained at true 8K. As a result, under the condition that the timing controller circuit 200 has only one timing controller 201, the frame rate of the display panel 12 is increased, and the dynamic visuals of the display panel 12 will be improved. In addition, the charge time of each data line of the display panel 12 is maintained at 3.74 microseconds (μs).

Figure 3:
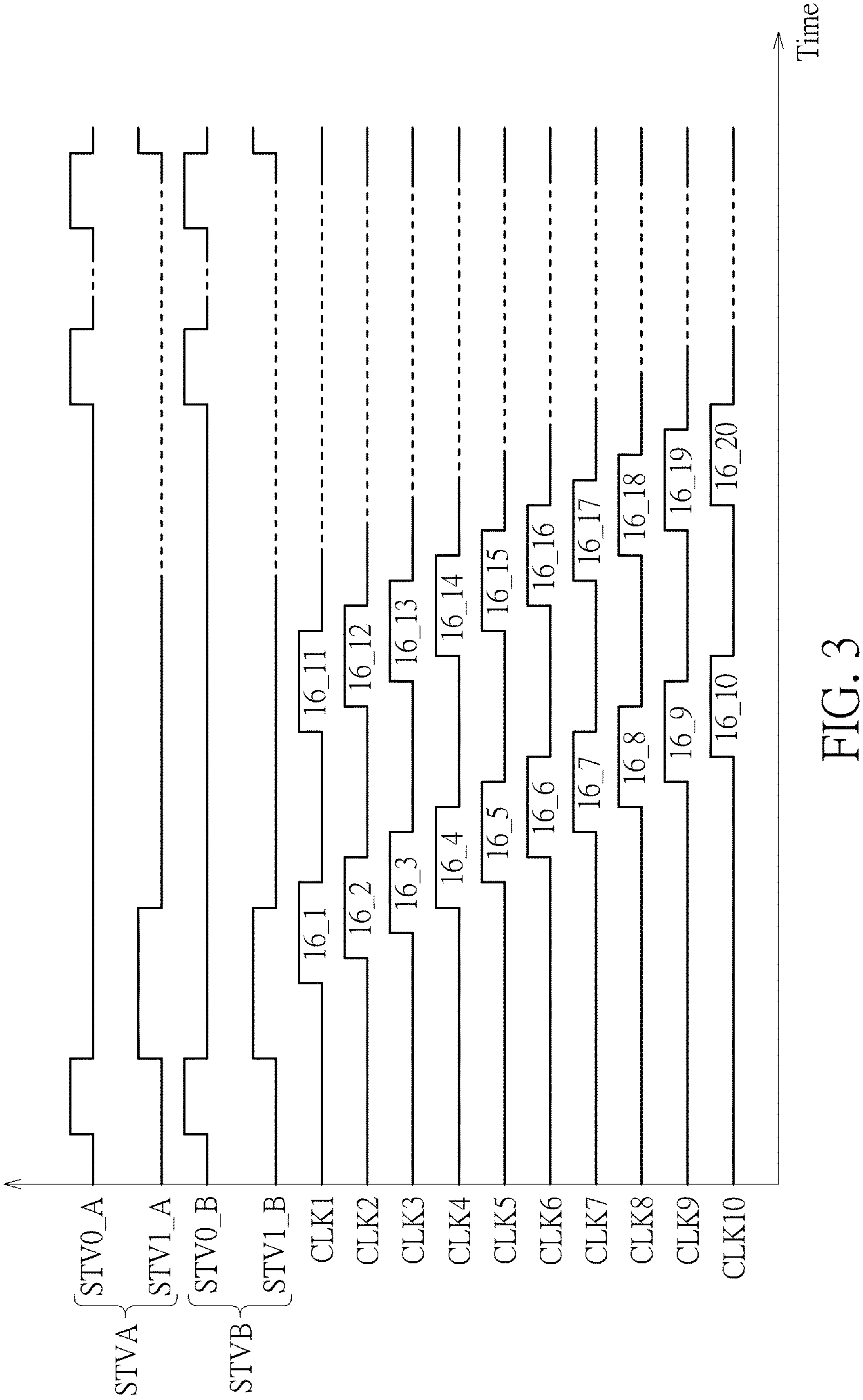
FIG. 3 is a timing diagram of a timing control output generated by the timing controller circuit shown in FIG. 2 according to an embodiment of the present invention.

FIG. 3 is a timing diagram of a timing control output generated by the timing controller circuit 200 shown in FIG. 2 according to an embodiment of the present invention. In this embodiment, the input timing IN_TIMING of the image data IDATA is 8K×4K @ 60 Hz. The first starting pulse signal STVA may include a plurality of odd pulse signals STV0_A and STV1_A, wherein a pulse signal width of the odd pulse signal STV0_A is 1.5*3.7 μs, and a pulse signal width of the odd pulse signal STV1_A is 3*3.7 μs. The second starting pulse signal STVB may include a plurality of even pulse signals STV0_B and STV1_B, wherein a pulse signal width of the even pulse signal STV0_B is 1.5*3.7 μs, and a pulse signal width of the even pulse signal STV1_B is 3*3.7 μs. Since the input timing IN_TIMING of the image data IDATA is 8K×4K @ 60 Hz, the timing control output TIMING_OUTPUT will control the GIP circuit 14 to sequentially turn on each of the gates 16_1-16_4320 of the display panel 12, to illuminate the display panel 12. As shown in FIG. 3, each of the clock signals CLK1-CLK10 has 432 pulses to turn on 432 gates in the gates 16_1-16_4320, respectively (e.g. the 432 pulses in the clock signal CLK1 turn on the gates 16_1, 16_11, 16_21, . . . , 16_4311, respectively), wherein a pulse signal width of each pulse is 2*3.7 μs. For brevity, only the pulses that correspond to the first 20 gates (i.e. the gates 16_1-16_20) of the gates 16_1 to 16_4320, respectively, are illustrated in FIG. 3.

Figure 4:
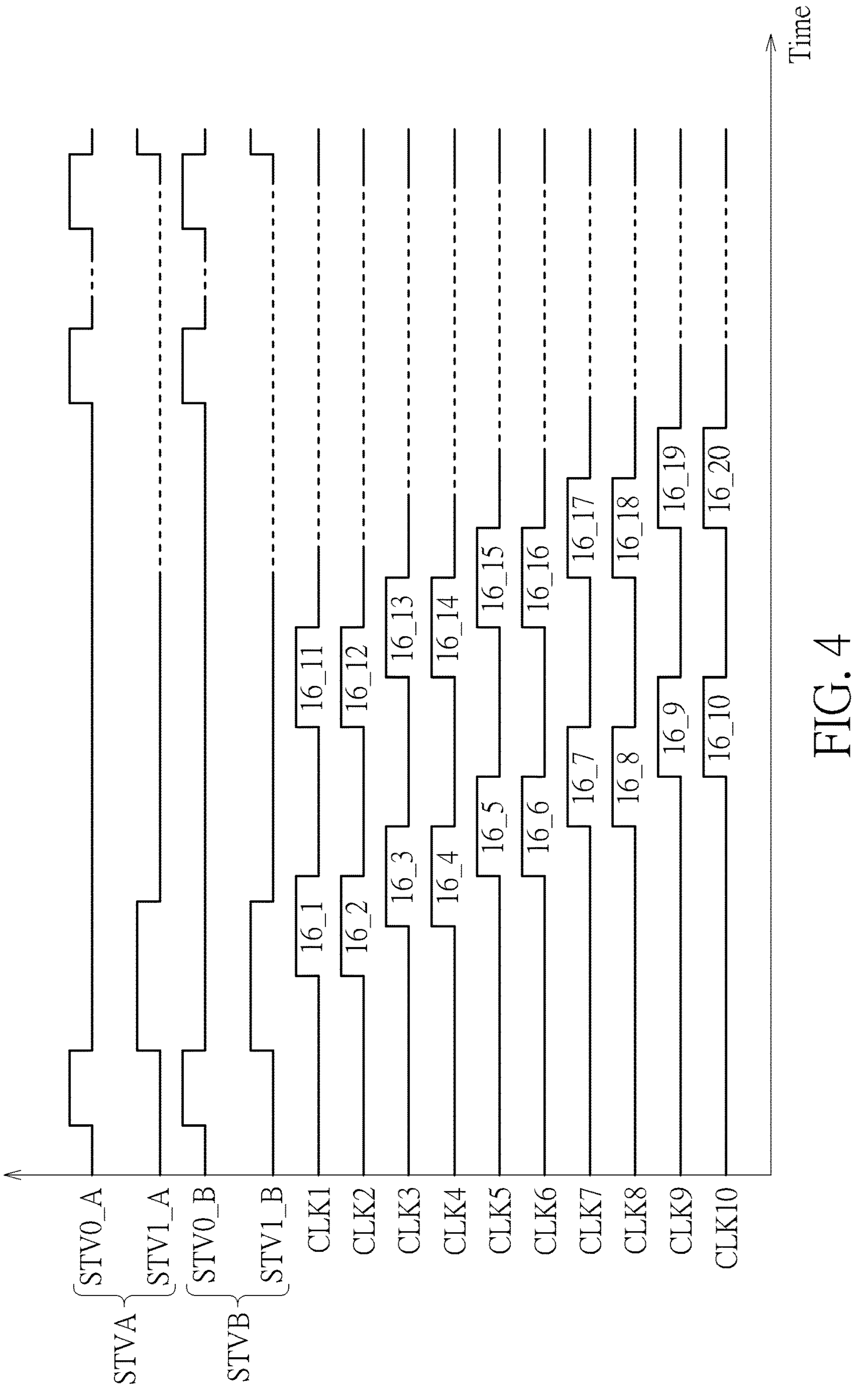
FIG. 4 is a timing diagram of a timing control output generated by the timing controller circuit shown in FIG. 2 according to another embodiment of the present invention.

FIG. 4 is a timing diagram of a timing control output generated by the timing controller circuit 200 shown in FIG. 2 according to another embodiment of the present invention. In this embodiment, the input timing IN_TIMING of the image data IDATA is 8K×2K @ 120 Hz. The first starting pulse signal STVA may include a plurality of odd pulse signals STV0_A and STV1_A, wherein a pulse signal width of the odd pulse signal STV0_A is 1.5*3.7 μs, and a pulse signal width of the odd pulse signal STV1_A is 3*3.7 μs. The second starting pulse signal STVB may include a plurality of even pulse signals STV0_B and STV1_B, wherein a pulse signal width of the even pulse signal STV0_B is 1.5*3.7 μs, and a pulse signal width of the even pulse signal STV1_B is 3*3.7 μs. Since the input timing IN_TIMING of the image data IDATA is 8K×2K @ 120 Hz, the timing control output TIMING_OUTPUT will control the GIP circuit 14 to sequentially turn on two gates in the gates 16_1-16_4320 of the display panel 12 at the same time (e.g. sequentially turn on the gates 16_1 and 16_2, the gates 16_3 and 16_4, the gates 16_5 and 16_6, . . . , and the gates 16_4319 and 16_4320 at the same time). As shown in FIG. 4, each of the clock signals CLK1-CLK10 has 432 pulses to turn on 432 gates in the gates 16_1-16_4320, respectively (e.g. the 432 pulses in the clock signal CLK1 turn on the gates 16_1, 16_11, 16_21, . . . , 16_4311, respectively), wherein a pulse signal width of each pulse is 2*3.7 μs. For brevity, only the pulses that correspond to the first 20 gates (i.e. the gates 16_1-16_20) of the gates 16_1 to 16_4320, respectively, are illustrated in FIG. 4.

Figure 5:
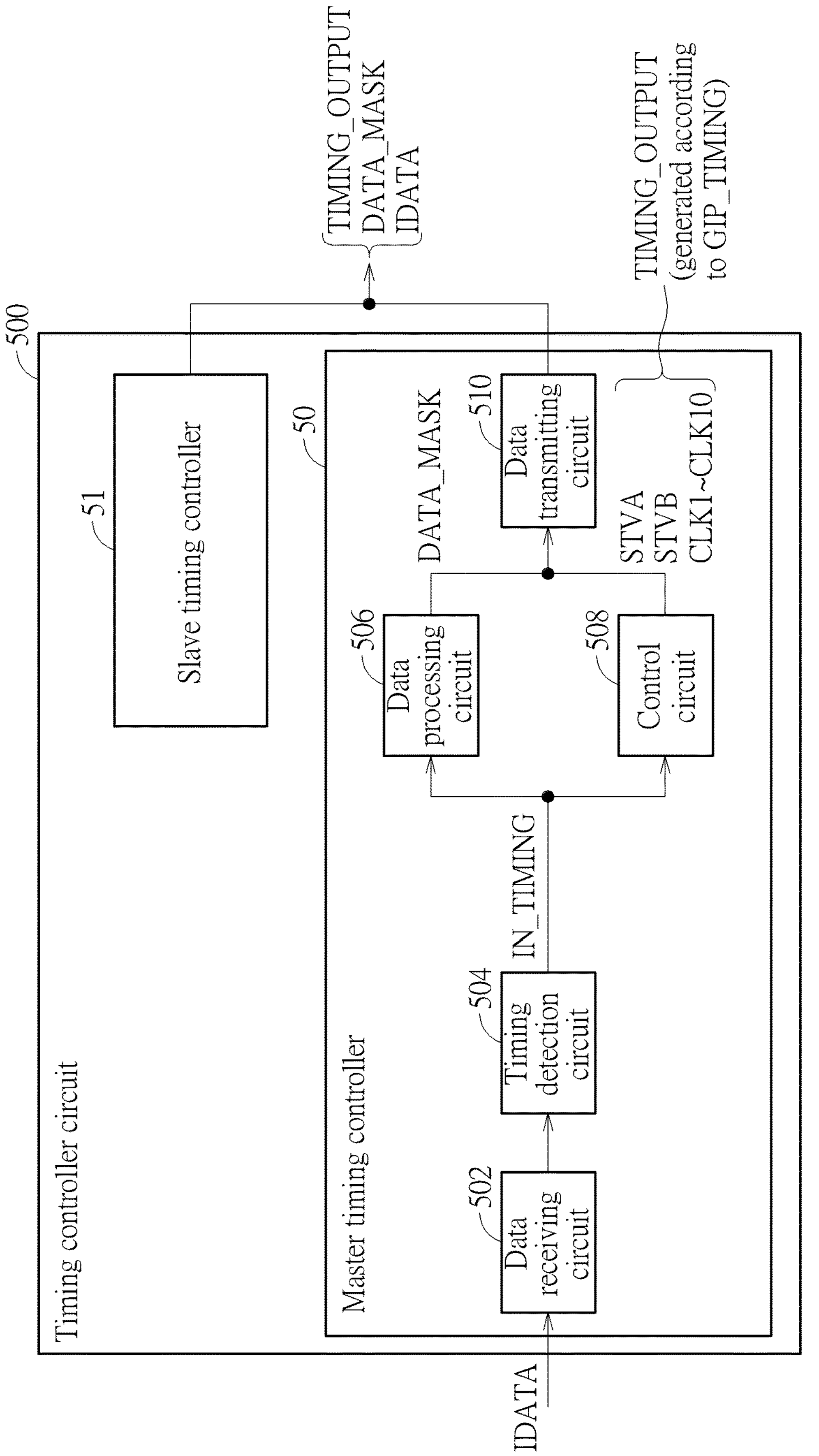
FIG. 5 is a diagram illustrating a timing controller circuit according to another embodiment of the present invention.

FIG. 5 is a diagram illustrating a timing controller circuit 500 according to another embodiment of the present invention. The timing controller circuit 10 shown in FIG. 1 may be implemented by the timing controller circuit 500 shown in FIG. 5. It should be noted that, in this embodiment, the resolution and the frame rate of the display panel 12 are 8K×4K and 120 Hz, respectively, and the timing controller circuit 500 may include a master timing controller 50 and a slave timing controller 51, wherein the master timing controller 50 may be arranged to control gate driving of all sub pixels of the display panel 12, and control data driving (source driving) of a part of sub-pixels in all sub-pixels of the display panel 12, and the slave timing controller 51 may be arranged to control data driving (source driving) of another part of sub-pixels in all sub-pixels of the display panel 12. For example, under the condition that the data output of the master timing controller 50 and the data output of the slave timing controller 51 are coupled to the left side and the right side of the display panel 12, respectively, the master timing controller 50 may be arranged to control the data driving of the left side of the display panel 12, and the slave timing controller 51 may be arranged to control the data driving of the right side of the display panel 12.

As shown in FIG. 5, the master timing controller 50 included in the timing controller circuit 500 may include a data receiving circuit 502, a timing detection circuit 504, a data processing circuit 506, a control circuit 508, and a data transmitting circuit 510. The data receiving circuit 502 may be arranged to receive an image data IDATA, wherein an input timing IN_TIMING of the image data IDATA may be 8K×4K @ 120 Hz (i.e. the resolution and the frame rate of the image data IDATA are 8K×4K and 120 Hz, respectively). The timing detection circuit 504 may be coupled to the data receiving circuit 502, and may be arranged to detect the input timing IN_TIMING of the image data IDATA. The data processing circuit 506 may be coupled to the timing detection circuit 504, and may be arranged to perform data masking upon the image data IDATA according to the input timing IN_TIMING of the image data IDATA, to generate a data masking signal DATA_MASK. The control circuit 508 may be coupled to the timing detection circuit 504, and may be arranged to determine the GIP timing GIP_TIMING of the GIP circuit 14 according to the input timing IN_TIMING of the image data IDATA, and generate a timing control output TIMING_OUTPUT (which includes a first starting pulse signal STVA, a second starting pulse signal STVB, and a plurality of clock signals CLK1-CLK10) according to the GIP timing GIP_TIMING. The data transmitting circuit 510 may be coupled to the data processing circuit 506 and the control circuit 508, and may be arranged to transmit the timing control output TIMING_OUTPUT, the image data IDATA, and the data masking signal DATA_MASK to the display panel 12, wherein the timing control output TIMING_OUTPUT is output to the GIP circuit 14, and the image data IDATA and the data masking signal DATA_MASK are output to the source driver circuit 18.

In this embodiment, the data masking signal DATA_MASK may be arranged to control the source driver circuit 18 to mask odd line data and only drive even line data in each even frame of the image data IDATA, and control the source driver circuit 17 to mask the even line data and only drive the odd line data in each odd frame of the image data IDATA. In this way, each frame of the display panel 12 will only display the data whose input timing IN_TIMING is 8K×2K @ 120 Hz. As a result, the timing controller circuit 500 may utilize the interlaced scanning structure to double the charging time of each data line of the display panel 12 from the original 1.87 μs to 3.74 μs, to improve the problem of insufficient charging time.

Figure 6:
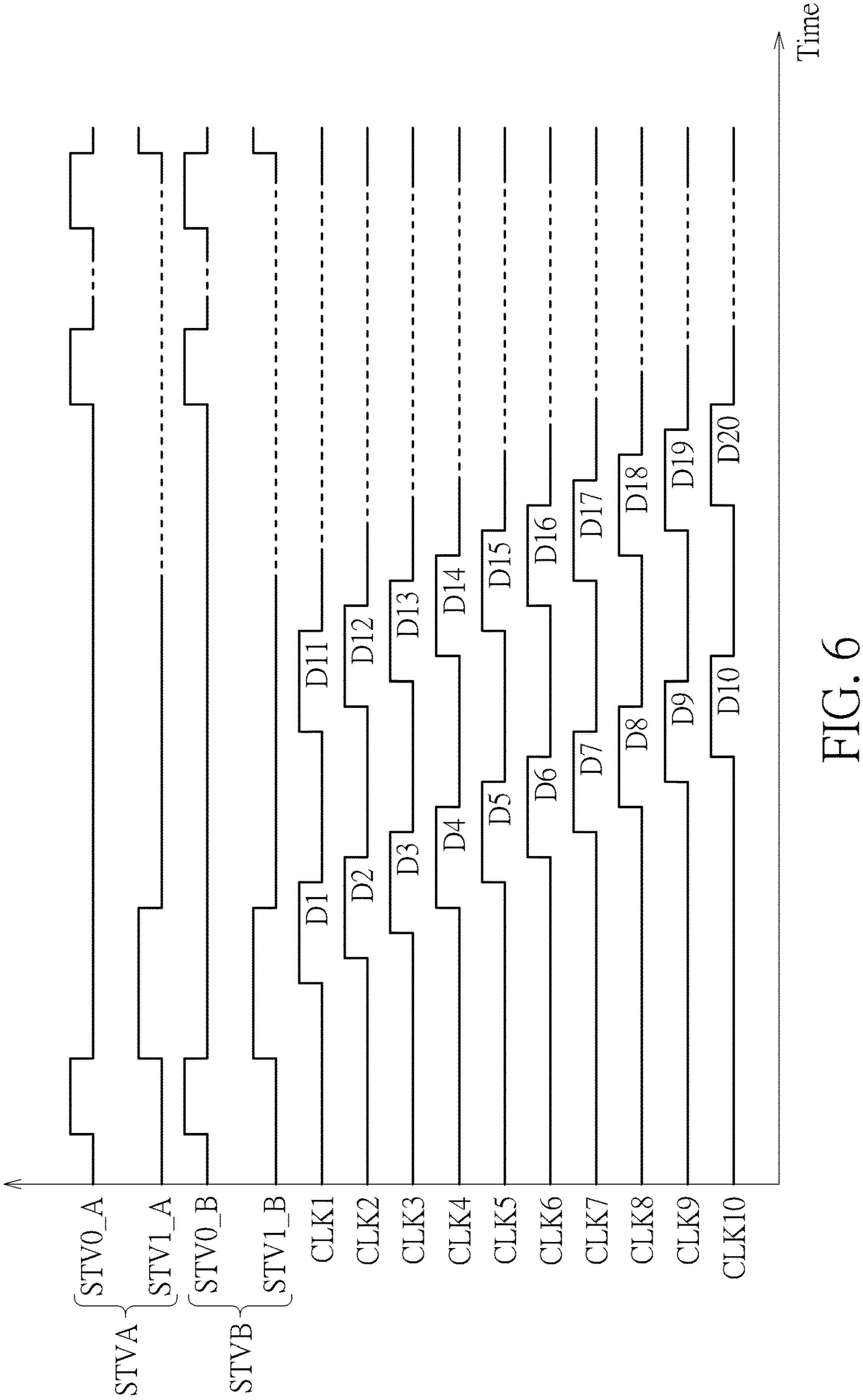
FIG. 6 is a timing diagram of a timing control output generated by the timing controller circuit shown in FIG. 5 according to an embodiment of the present invention.

FIG. 6 is a timing diagram of a timing control output generated by the timing controller circuit 500 shown in FIG. 5 according to an embodiment of the present invention. As shown in FIG. 6, the first starting pulse signal STVA may include a plurality of odd pulse signals STV0_A and STV1_A, wherein a pulse signal width of the odd pulse signal STV0_A is 3*1.85 μs, and a pulse signal width of the odd pulse signal STV1_A is 6*1.85 μs. The second starting pulse signal STVB may include a plurality of even pulse signals STV0_B and STV1_B, wherein a pulse signal width of the even pulse signal STV0_B is 3*1.85 μs, and a pulse signal width of the even pulse signal STV1_B is 6*1.85 μs. The timing control output TIMING_OUTPUT will control the GIP circuit 14 to sequentially turn on each gate in the gates 16_1-16_4320 of the display panel 12, to light up the display panel 12. Each of the clock signals CLK1-CLK10 has 432 pulses to turn on 432 gates in the gates 16_1-16_4320, respectively (e.g. the 432 pulses in the clock signal CLK1 turn on the gates 16_1, 16_11, 16_21, . . . , 16_4311, respectively), wherein a pulse signal width of each pulse is 4*1.85 μs. For brevity, only the pulses that correspond to the first 20 gates (i.e. the gates 16_1-16_20) of the gates 16_1 to 16_4320, respectively, are illustrated in FIG. 6.

It is assumed that the image data IDATA has a plurality of odd line data D1, D3, D5, . . . , D4319 (where each odd line data includes sub-pixel data that are arranged to drive a plurality of TFTs on a same odd scanning line) and a plurality of even line data (where each even line data includes sub-pixel data that are arranged to drive a plurality of TFTs on a same even scanning line). Under the condition that the data masking signal DATA_MASK controls the source driver circuit 18, a plurality of odd gates corresponding to a plurality of odd gate lines will only display the odd line data (e.g. the gate 16_1 will only display the odd line data D1, and the gate 16_3 will only display the odd line data D3), and a plurality of even gates corresponding to a plurality of even gate lines will only display the even line data (e.g. the gate 16_2 will only display the even line data D2, and the gate 16_4 will only display the even line data D4). For brevity, only the pulses that correspond to the first 20 gates (i.e. the gates 16_1-16_20) of the gates 16_1 to 16_4320, respectively, are illustrated in FIG. 6.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A timing controller circuit, arranged to control at least a gate in panel (GIP) circuit in a display panel, and comprising:

a data receiving circuit, arranged to receive an image data;

a timing detection circuit, coupled to the data receiving circuit, and arranged to detect an input timing of the image data;

a data processing circuit, coupled to the timing detection circuit, and arranged to perform data masking on the image data according to the input timing of the image data, to generate a data masking signal;

a control circuit, coupled to the timing detection circuit, and arranged to determine a GIP timing of the GIP circuit according to the input timing of the image data, and generate a timing control output according to the GIP timing, wherein in response to different input timings of the image data, the control circuit performs switching selection between different GIP timings of the GIP circuit; and a data transmitting circuit, coupled to the control circuit and the data processing circuit, and arranged to transmit the timing control output and the data masking signal to the display panel;

wherein the data masking signal is output to a source driver circuit of the display panel; and the data masking signal controls the source driver circuit to mask odd line data and only drive even line data in each even frame of the image data, and control the source driver circuit to mask the even line data and only drive the odd line data in each odd frame of the image data.

2. The timing controller circuit of claim 1, wherein the timing controller circuit has only one timing controller, and the only one timing controller is arranged to control data driving and gate driving of all sub-pixels of the display panel, and comprises the data receiving circuit, the timing detection circuit, the control circuit, and the data transmitting circuit.

3. The timing controller circuit of claim 1, wherein the timing control output comprises a first starting pulse signal and a second starting pulse signal; the first starting pulse signal is arranged to turn on a plurality of first shift registers corresponding to a plurality of odd gate lines in the GIP circuit; the second starting pulse signal is arranged to turn on a plurality of second shift registers corresponding to a plurality of even gate lines in the GIP circuit; and the plurality of odd gate lines and the plurality of even gate lines are coupled to a plurality of gates in the display panel.

4. The timing controller circuit of claim 3, wherein the timing control output further comprises a plurality of clock signals, and the plurality of clock signals are arranged to drive the plurality of odd gate lines and the plurality of even gate lines through the plurality of first shift registers and the plurality of second shift registers.

5. The timing controller circuit of claim 1, wherein in response to the input timing of the image data, the timing control output controls the GIP circuit to sequentially turn on each gate in all gates of the display panel.

6. The timing controller circuit of claim 5, wherein the input timing of the image data is 8K×4K @ 60 Hertz (Hz).

7. The timing controller circuit of claim 1, wherein in response to the input timing of the image data, the timing control output controls the GIP circuit to sequentially turn on at least two gates in all gates of the display panel at the same time.

8. The timing controller circuit of claim 7, wherein sub-pixels corresponding to the at least two gates, respectively, display a same sub-pixel data transmitted by the data transmitting circuit in the image data.

9. The timing controller circuit of claim 7, wherein the input timing of the image data is 8K×2K @ 120 Hertz (Hz).

10. The timing controller circuit of claim 7, wherein a frame rate of the display panel is at least doubled.

11. The timing controller circuit of claim 1, wherein the timing controller circuit comprises a master timing controller and a slave timing controller; the master timing controller is arranged to control gate driving of all sub-pixels of the display panel, and control data driving of a part of sub-pixels in all sub-pixels of the display panel; the master timing controller comprises the data receiving circuit, the timing detection circuit, the data processing circuit, the control circuit, and the data transmitting circuit; and the slave timing controller is arranged to control data driving of another part of sub-pixels in all sub-pixels of the display panel.

12. The timing controller circuit of claim 1, wherein a charge time of each data line of the display panel is doubled.

* * * * *